United States Patent
Van Haag

(10) Patent No.: US 6,228,009 B1
(45) Date of Patent: May 8, 2001

(54) DEFLECTION COMPENSATING ROLL AND METHOD OF USE THEREOF

(75) Inventor: Rolf Van Haag, Kerken (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/317,627

(22) Filed: May 25, 1999

(30) Foreign Application Priority Data

May 26, 1998 (DE) .............................................. 198 23 407

(51) Int. Cl.[7] .................................................. B29C 43/46
(52) U.S. Cl. .................................. 492/7; 492/16; 492/20
(58) Field of Search ............................ 492/7, 16, 20; 162/358.3

(56) References Cited

U.S. PATENT DOCUMENTS

| | | |
|---|---|---|
| 3,887,245 | 6/1975 | Rouch . |
| 3,909,080 | 9/1975 | Hällnor et al. . |
| 4,023,480 | 5/1977 | Biondetti . |
| 4,856,154 * | 8/1989 | Nikulainen et al. .................... 492/16 |
| 5,254,070 * | 10/1993 | Callhoff ................................. 492/16 |
| 5,928,121 * | 7/1999 | Stotz et al. ............................ 492/16 |

FOREIGN PATENT DOCUMENTS

| | | |
|---|---|---|
| 3022491 | 12/1981 | (DE) . |
| 2510410 | 3/1982 | (DE) . |
| 3909911 | 6/1990 | (DE) . |

* cited by examiner

*Primary Examiner*—I Cuda Rosenbaum
(74) *Attorney, Agent, or Firm*—Greenblum & Bernstein, P.L.C.

(57) ABSTRACT

Deflection compensating roll and method of use thereof. The deflection compensating roll comprises a carrier that is nonrotatably held by an outer bearing and is disposed within a roll shell. The invention also includes a plurality of hydrostatic support devices arranged about the outer surface of the carrier and support the roll shell. Also included is a hydraulic piston/cylinder unit having an actuating element, the outer bearing supported on the actuating element, the actuating element forcing the outer bearing toward a mating roll. A bearing surface intermediate the outer bearing and the actuating element is present, and at least one pocket located opposite the bearing surface and having a surrounding rim is also present. The pocket is connected by a restrictor to a pocket pressurized fluid source, and a gap is present intermediate the bearing surface and the rim, the pocket being further connected by a gap to an outlet. Also provided is a method of applying a deflection compensating roll toward a mating roll.

8 Claims, 1 Drawing Sheet

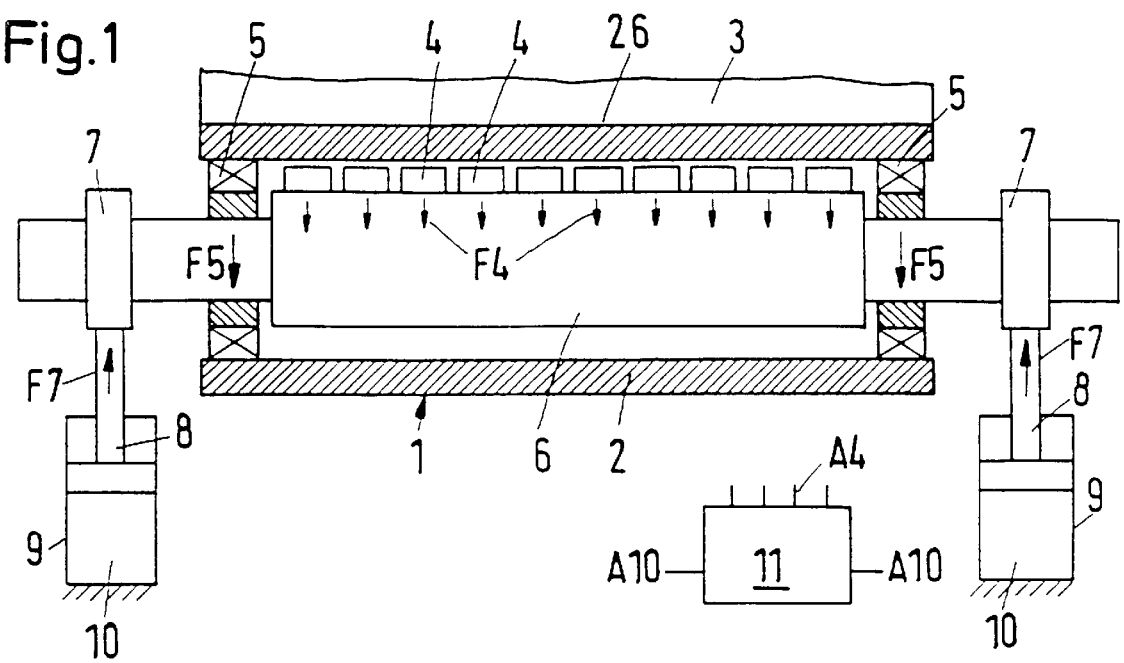
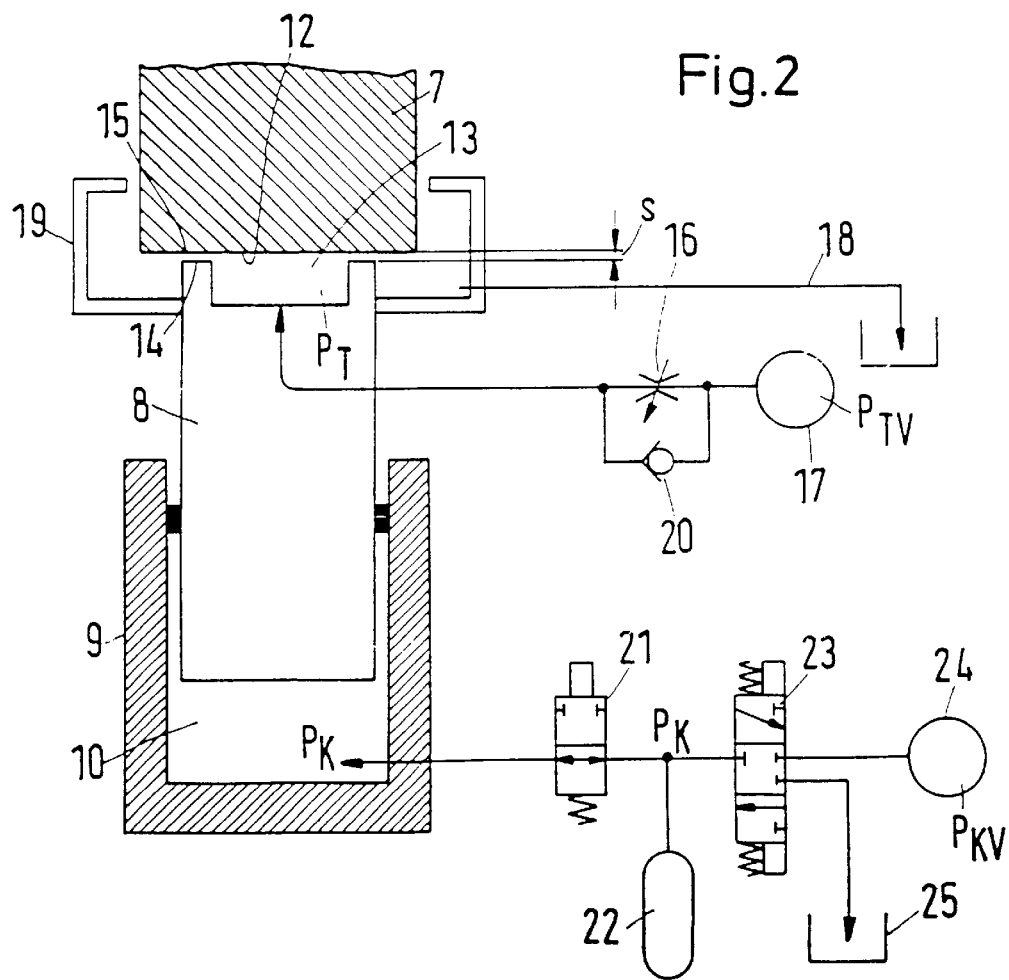

DEFLECTION COMPENSATING ROLL AND METHOD OF USE THEREOF

CROSS-REFERENCE TO RELATED APPLICATIONS

The present application claims priority under 35 U.S.C. § 119 of German Patent Application No. 198 23 407.4, filed on May 26, 1998, the disclosure of which is expressly incorporated by reference herein in its entirety.

BACKGROUND OF THE INVENTION

1. Field of the Invention

The present invention relates to a deflection compensating roll and method of use thereof, and more particularly, to a deflection compensation roll with a carrier that is held nonrotatably in outer bearings and passes through a rotatable roll shell and supports the latter by interposed hydrostatic support devices.

2. Description of Background Information

German Patent No. DE 25 10 410 C3 discloses a deflection compensating roll having a control apparatus that acts on pressure control valves in the feed lines to the hydrostatic support devices and to the piston/cylinder units. When the line load is changed by hydrostatic support elements, the bearing forces in the outer bearings must also be readjusted using the hydraulic piston/cylinder units. The readjustment is minor, normally ranging between approximately 0–10% of the applied line load. The unavoidable friction between piston and cylinder results either in an imprecise pressure setting of the outer bearings, or the pressure can only be precisely set with great effort.

German Patent No. DE 39 09 911 C1 discloses a measurement device for ascertaining the bearing stress on an inner bearing between the roll shell and the carrier of a deflection compensating roll. Pressure fluid pockets are provided on opposite sides of the bearing axis on at least one bearing surface. These pressure fluid pockets are supplied through a restrictor with pressurized fluid which passes through the gap formed between the bearing surfaces to an outlet. The pressures of these pockets are considered "sensor measurement values."

SUMMARY OF THE INVENTION

The present invention provides a deflection compensating roll and method of use thereof. The deflection compensating roll of the present invention roll has a carrier that is nonrotatably held by an outer bearing and is disposed within a roll shell. The present invention also includes a plurality of hydrostatic support devices arranged about the outer surface of the carrier that support the roll shell. Also included is a hydraulic piston/cylinder unit having an actuating element, the outer bearing supported on the actuating element, and the actuating element adapted to force the outer bearing toward a mating roll. A bearing surface intermediate the outer bearing and the actuating element is present, and at least one pocket located opposite the bearing surface and having a surrounding rim is also present. The pocket is connected by a restrictor to a pocket pressurized fluid source, and a gap is present intermediate the bearing surface and the rim, the pocket being further connected by a gap to an outlet.

An inner bearing may be present at each end of the roll shell that functions to support the roll shell. Additionally, a control device adapted to control the pressure supplied to the support devices in zones may be provided.

A feature of the invention provides a catch basin surrounding the surrounding rim, with the outlet exiting from the catch basin.

According to another feature of the invention the restrictor may be adjustable.

Furthermore, a check valve that bypasses the restrictor may be provided, the check valve opening in a direction toward the pocket pressurized fluid source.

A pressure chamber present within the piston/cylinder unit may be provided, along with a piston pressure source adapted to supply the pressure chamber with pressurized fluid, as well as a shutoff valve that connects the pressure chamber to the piston pressure source.

Additionally, a pressure accumulator adapted to be connected to the pressure chamber may be provided, as well as a changeover valve adapted to charge the pressure chamber with fluid from the piston pressure source, and a container adapted to accept fluid from the pressure accumulator.

The method of applying a deflection compensating roll toward a mating roll includes forcing the outer bearings toward the mating roll by actuating the actuating element of the hydraulic piston/cylinder unit.

In another feature of the invention, the pressure supplied to the support devices may be controlled in zoned by using a control device. Additionally, the restrictor may be adjusted.

The method may additionally comprise bypassing the restrictor with a check valve in a direction toward the pocket pressurized fluid source. The method may also comprise connecting the pressure chamber of the piston/cylinder unit to a piston pressure source via a shutoff valve.

A further feature of the method comprises connecting a pressure accumulator to the pressure chamber and charging the pressure chamber with fluid from the piston pressure source via a changeover valve. Further, the method may additionally comprise discharging fluid from the accumulator into a container.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 1 is a schematic representation of a deflection compensating roll in accordance with the invention; and FIG. 2 schematically shows the outer bearing region of the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The invention simplifies and improves readjustment of the bearing forces in a deflection compensating roll.

A bearing surface is provided between actuating element and outer bearing. Opposite the bearing surface, at least one pocket having a surrounding rim is present. The pocket is connected by a restrictor to a pocket pressurized fluid source and is connected to an outlet by the gap between the bearing surfaces and rim.

The initial adjustment of these bearing forces is performed by using the piston/cylinder units of the outer bearing. Subsequent readjustment takes place automatically. If the bearing force to be exerted increases, the gap decreases and the pressure in the pocket rises. Conversely, the gap increases and the pressure in the pocket drops when the bearing forces to be exerted decrease, resulting in different volume flow rates. Thus, a working range results that is bounded by a minimum and a maximum volume flow rate wherein the gap varies by a certain amount, for example, between approximately 10 and 150 $\mu$ m. Slight line load changes, such as a rise from the pressure correction for a zone, are automatically taken into account at the outer bearings. Once the described range has been traversed to its end, only then is pressurized fluid admitted into or released from the pressure chamber of the piston/cylinder unit.

It is desirable for the support devices to be pressure-controllable by zones using a control device. With this type of zone-by-zone control, many small pressure changes that arise at the support devices are fully automatically compensated in the outer bearings.

The rim may be surrounded by a catch basin from which the outlet exits. The supplied pressurized fluid can thus be used in a closed cycle.

Moreover, the restrictor may be adjustable, thereby making it possible to adjust the pocket pressure to varying conditions.

It is also advantageous for the restrictor to be bypassed by a check valve opening toward the pocket pressurized fluid source. In this way, the pocket can be relieved of the load when operation ends.

The pressure chamber of the piston/cylinder unit may be connected through a shutoff valve to a piston pressure source. Consequently, in normal operation, the pressure chamber of the piston/cylinder unit can be shut off so that there is no danger of the piston changing its position during the automatic readjustment.

A pressure accumulator capable of being connected to the pressure chamber may be chargeable with pressure from the piston pressure source through a changeover valve and may further be dischargeable into a container. Pressure that is suitable for readjustment of the piston/cylinder unit can be held continuously available in the pressure accumulator.

Referring to FIGS. 1 and 2 wherein like numerals represent like elements, the illustrated deflection compensating roll 1 has a roll shell 2 that works in conjunction with a mating roll 3, which may be rigidly mounted to a frame (not shown), but may be mounted to other locations in alternative embodiments. The mating roll 3 can also be the bottom center roll of a stack of rolls whose uppermost roll is supported on the frame. The roll shell 2 is supported by hydrostatic support elements 4 and inner bearings 5 on a carrier 6 that passes through the roll shell 2 and is nonrotatably held in outer bearings 7. The outer bearings 7 are supported on actuating elements 8 which can be forced upward by piston/cylinder units 9 that have a pressure chamber 10.

The hydrostatic support devices 4 can take any desired, known structural form, for example, in accordance with DE 30 22 491 C1. A control device 11 has device apertures A4 with which the pressure in the individual support devices 4 is preset, and chamber apertures A10 with which the pressure in the pressure chambers 10 of the piston/cylinder units 9 is preset. In this way, a desired compressive strain profile results in a working gap between the deflection compensating roll 1 and mating roll 3 and is suitable for treatment of a material web such as a paper or textile web. The support devices 4 are preferably zone-controlled and, more particularly, are supplied individually or in pairs with varying pressures.

The total magnitude of the support forces F4 of the support devices 4 and of the bearing forces F5 of the inner bearing 5 must equal the total magnitude of the outer bearing forces F7, where the latter each make up about 50% of the total forces of the line load. Thus, a bearing surface 12 is provided between the outer bearing 7 and the actuating element 8, and is opposite at least one pocket 13 having a surrounding rim 14. A gap 15 is present between the rim 14 and the bearing surface 12. The pocket 13 is connected by an adjustable restrictor 16 to a pocket pressurized fluid source 17 and is further connected by the gap 15 to an outlet 18. The pocket 13 exerts a pocket pressure $P_T$. The outlet 18 originates at a catch basin 19 which surrounds the rim 14. The restrictor 16 is bypassed by a check valve 20 which opens in the direction toward the pocket pressurized fluid source 17.

The pressure chamber 10 of the piston/cylinder unit 9 is connected by a shutoff valve 21 to a pressure accumulator 22. The accumulator 22 can be connected by a reversing exchange valve 23 to either a piston pressure source 24 or a container 25. Thus, using this valve 23, piston pressure $P_K$ can be preset for the pressure chamber 10, the piston pressure being preset by the control device 11.

The pocket pressurized fluid source 17 generates a supply pressure $P_{TV}$ required for the pocket system. The piston pressure source 24 generates a supply pressure $P_{KV}$ required for supplying the pressure chamber 10.

At startup, with the aid of the reversing exchange valve 23, the piston pressure $P_K$ in both the pressure chamber 10 and the pressure accumulator 22 is brought to the value preset by the control device 11. The shutoff valve 21 may then be closed. At the same time, all support devices 4 are supplied with pressurized fluid in order to generate a preset compressive strain profile in the roll gap 26.

In addition, pressurized fluid such as oil is delivered from the pocket pressurized fluid source 17 through the restrictor 16, the pocket 13, the gap 15 and the outlet 18. As a result, the pocket pressure $P_T$ in the pocket 13 adjusts to a value that exerts a bearing force equal to the force acting on the actuating element 8 in the pressure chamber 10.

If small changes in shape are now made to the roll by variable exertion of force at the support devices 4, causing the forces to be exerted on the outer bearings 7 to change, automatic pressure correction results. An increase in the bearing forces leads to a decrease in the gap width "s." The volume flow rate then throttled more strongly in the gap 15 than before. The pocket pressure $P_T$ rises and compensates for the increase in pressure. Conversely, if the bearing force drops, the gap width s increases. The pocket pressure $P_T$ drops and the desired equilibrium is obtained again. Since the gap width can change between approximately 10 and 150 $\mu$ m, the result is a relatively large control range that makes it unnecessary to adjust the piston pressure $P_K$. However, if the boundary range of the automatic pressure correction should be reached, piston pressure $P_K$ may easily be increased by admitting a small quantity of pressurized fluid. Similarly, the piston pressure $P_K$ may be decreased releasing a similar quantity of pressurized fluid.

In some cases, the shutoff valve 21 may not be needed if the frictional forces in the piston/cylinder unit 9 are large enough that they exceed the pressure changes accounted for by the pocket pressure.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A deflection compensating roll comprising:
    a carrier having opposed ends and an outer surface, said carrier being nonrotatably held by each said opposed end in a respective outer bearing;
    a rotatable roll shell, said carrier disposed within said roll shell;
    a plurality of hydrostatic support devices arranged about said outer surface of said carrier, said support devices supporting said roll shell;
    a hydraulic piston/cylinder unit having an actuating element, said outer bearing supported on said actuating element, said actuating element adapted to force said outer bearing toward a mating roll;
    a bearing surface intermediate said outer bearing and said actuating element; and
    at least one pocket located opposite said bearing surface and having a surrounding rim, said at least one pocket connected by a restrictor to a pocket pressurized fluid source, a gap being present intermediate said bearing surface and said rim, said at least one pocket further connected by a gap to an outlet.

2. The deflection compensating roll according to claim 1, wherein said roll shell has opposed ends, the deflection compensating roll further comprising an inner bearing located at each of said opposed ends of said roll shell, said inner bearings supporting said roll shell.

3. The deflection compensating roll according to claim 1, further comprising a control device adapted to control the pressure supplied to said plurality of support devices in zones.

4. The deflection compensating roll according to claim 1, wherein said surrounding rim is surrounded by a catch basin, said outlet exiting from said catch basin.

5. The deflection compensating roll according to claim 1, wherein said restrictor is adjustable.

6. The deflection compensating roll according to claim 1, further comprising a check valve that bypasses said restrictor, said check valve opening in a direction toward said pocket pressurized fluid source.

7. The deflection compensating roll according to claim 1, further comprising:
    a pressure chamber present within said piston/cylinder unit;
    a piston pressure source adapted to supply said pressure chamber with pressurized fluid; and
    a shutoff valve that connects said pressure chamber to said piston pressure source.

8. The deflection compensating roll according to claim 7, further comprising:
    a pressure accumulator adapted to be connected to said pressure chamber;
    a changeover valve adapted to charge said pressure chamber with fluid from said piston pressure source; and
    a container adapted to accept fluid from said pressure accumulator.

* * * * *